US012715106B2

(12) United States Patent
Blume

(10) Patent No.: US 12,715,106 B2
(45) Date of Patent: Aug. 25, 2026

(54) SYSTEM AND METHOD FOR PLACING A CONDUIT HOLE IN AN ENCLOSURE

(71) Applicant: Michael A. Blume, Yorktown, NY (US)

(72) Inventor: Michael A. Blume, Yorktown, NY (US)

( * ) Notice: Subject to any disclaimer, the term of this patent is extended or adjusted under 35 U.S.C. 154(b) by 362 days.

(21) Appl. No.: 18/375,267

(22) Filed: Sep. 29, 2023

(65) Prior Publication Data

US 2025/0108500 A1 Apr. 3, 2025

(51) Int. Cl.
*B25H 7/02* (2006.01)

(52) U.S. Cl.
CPC .................................... *B25H 7/02* (2013.01)

(58) Field of Classification Search
CPC ............ B25H 7/00; B25H 7/005; B25H 7/02
USPC ................ 33/21.3, 285, 286, 529, 563, 644
See application file for complete search history.

(56) References Cited

U.S. PATENT DOCUMENTS 5,568,265 A * 10/1996 Matthews .............. G01B 11/27 356/138
5,653,036 A * 8/1997 Dansereau ............. A62C 35/68 33/666
6,371,626 B1 * 4/2002 Addona ............... G01C 15/002 362/253
6,857,193 B2 * 2/2005 Kallesen .............. G01C 15/008 33/286
6,868,789 B1 * 3/2005 Basu ......................... F42B 3/26 102/275.12
6,986,209 B2 * 1/2006 Cook ................... G01C 15/008 33/286
7,464,478 B2 * 12/2008 Adrian ............... B23Q 17/2404 33/642
7,469,483 B2 * 12/2008 Martin ................... B25H 7/045 33/562
7,676,946 B2 * 3/2010 Page ......................... G09F 7/18 33/666
7,748,127 B1 * 7/2010 Cosimano ............ G01C 15/002 33/286
7,765,703 B2 * 8/2010 Buckus ..................... B64F 5/10 33/645
7,793,423 B2 * 9/2010 Loftis ....................... F16L 1/10 356/138

(Continued)

FOREIGN PATENT DOCUMENTS

EP 1002627 A2 * 5/2000 ............. B25B 13/48

*Primary Examiner* — George B Bennett
(74) *Attorney, Agent, or Firm* — Amster, Rothstein & Ebenstein LLP

(57) ABSTRACT

A kit for measuring a center point for a knockout of an enclosure including threaded caps, each threaded cap having a corresponding size that allows for threaded attachment of the threaded cap to one of a plurality of conduits having a standard diameter size, each of the plurality of conduits intended for extension into an enclosure through a corresponding knockout formed in the enclosure, each threaded cap comprising a marking element disposed at a center point of the threaded cap, the marking element configured to allow for measurement of distances from the center point of the threaded cap to an adjacent outer side edge of the enclosure and from the center point of the threaded cap to an adjacent outer front or back edge of the enclosure to thereby mark a center point of the corresponding knockout to be formed.

11 Claims, 15 Drawing Sheets

(56) References Cited

U.S. PATENT DOCUMENTS

| | | | | |
|---|---|---|---|---|
| 7,992,311 | B2 * | 8/2011 | Cerwin | B25H 1/0092 33/286 |
| 8,096,060 | B1 * | 1/2012 | Storjohann | E04C 5/18 33/518 |
| 8,893,395 | B2 * | 11/2014 | Mickow | G01C 15/002 33/529 |
| 8,893,396 | B2 * | 11/2014 | Gamon | G01C 15/004 33/529 |
| 11,662,432 | B2 * | 5/2023 | Elran | G06T 17/00 33/286 |
| 11,662,470 | B2 * | 5/2023 | Herter | G01C 15/06 33/290 |
| 11,692,817 | B2 * | 7/2023 | Jozokos | F01D 25/285 33/412 |
| 12,264,757 | B2 * | 4/2025 | Williams | B25H 7/005 |
| 2006/0230624 | A1 * | 10/2006 | Robbins | B21D 53/40 33/194 |
| 2009/0000135 | A1 * | 1/2009 | Flowers, Jr. | G01C 9/20 33/286 |
| 2009/0313841 | A1 * | 12/2009 | Calleros | G01B 1/00 33/528 |
| 2010/0095540 | A1 * | 4/2010 | Berkman | G01C 15/00 33/301 |
| 2010/0303567 | A1 * | 12/2010 | Thomas | B23B 51/0426 408/1 BD |
| 2012/0117813 | A1 * | 5/2012 | Stevenson | G01C 15/002 33/286 |
| 2019/0160553 | A1 * | 5/2019 | Pertschi | B23B 35/00 |
| 2023/0041363 | A1 * | 2/2023 | Montelongo | H02G 1/00 |
| 2023/0264339 | A1 * | 8/2023 | Cerwin | B23B 49/00 33/286 |
| 2024/0418494 | A1 * | 12/2024 | Lucas | B43L 7/005 |

* cited by examiner

100

60

100

SYSTEM AND METHOD FOR PLACING A CONDUIT HOLE IN AN ENCLOSURE

FIELD OF THE INVENTION

The present invention relates to forming holes in walls of an enclosure, and in particular to systems and methods of forming accurate conduit holes in an enclosure for installation of conduits through the walls of the enclosure.

BACKGROUND

Conventional techniques for placing a conduit hole in a wall of an electrical enclosure for the installation of an electrical conduit include determining the diameter of the conduit and marking the exact center of the conduit on the enclosure sidewall. This is typically done using a ruler and straight edge. The hole is then formed by a conventional knockout set, which includes a circular die and cylindrical anvil interconnected by a threaded bolt. A hole is drilled through the enclosure wall at the point marked as the center of conduit. The die is placed on the outside of the enclosure wall, the cylindrical anvil is placed on the opposite side of the enclosure wall and the bolt extends through the anvil, the drilled hole in the enclosure wall and into the die. By tightening the bolt, the die is drawn through the enclosure wall and into the cylindrical anvil to thereby form a conduit opening in the enclosure wall, which should be positioned correctly for the installation of the electrical conduit if the center was laid-out correctly on the enclosure wall. Through experience, this method of determining the exact center of a conduit has been found to be time consuming and inexact.

It is well known that in order for electrician's to properly install conduits they must frequently drill holes, commonly referred to as “entry” holes for receipt of the electrical conduit, such as for entry of the conduit and wire therein into a panel forming one end of a wiring enclosure, or through some other surface such as a wall or floor. Because the conduits are referred to in the trade by inside diameter, which may include fractions of an inch, and because the holes which receives a given conduit must be large enough to accommodate the added dimension of the conduits wall, accurate and neat formation of the proper size(s) and number of conduit entry can become complex and extremely time consuming. This is particularly the case if a large number and variety of sizes of conduits are required.

SUMMARY OF THE INVENTION

An object of the present invention is to provide tools and a kit including the tools that allow for quick and accurate measurement of the center point of a conduit knockout to be formed in an enclosure.

According to an exemplary embodiment of the present invention, a kit for measuring a center point for a knockout of an enclosure, comprises: a set of threaded caps, each threaded cap having a corresponding size that allows for threaded attachment of the threaded cap to one of a plurality of conduits having a standard diameter size, each of the plurality of conduits intended for extension into an enclosure through a corresponding knockout formed in the enclosure, each threaded cap comprising a marking element disposed at a center point of the threaded cap, the marking element configured to allow for measurement of distances from the center point of the threaded cap to an adjacent outer side edge of the enclosure and from the center point of the threaded cap to an adjacent outer front or back edge of the enclosure to thereby mark a center point of the corresponding knockout to be formed; and a centering square comprising open grooves that intersect at a crossing point, the centering square configured for placement on the enclosure with the crossing point aligned with the marked center point to allow for formation of crossed lines using the open grooves that intersect at the center point of the corresponding knockout to be formed and which can be aligned with center marks on a knockout die of a knockout punch.

In exemplary embodiments, the marking element is a pin.

In exemplary embodiments, the marking element is a laser.

In exemplary embodiments, the threaded caps are made of plastic.

In exemplary embodiments, the centering square is made of plastic.

In exemplary embodiments, the kit further comprises a case configured for storage of the threaded caps.

In exemplary embodiments, the case comprises compartments each corresponding to one of the threaded caps and configured for storage of the one of the threaded caps.

In exemplary embodiments, the compartments are made of foamed material.

In exemplary embodiments, each threaded cap is sized to accommodate a corresponding one of the following standard conduit sizes: 1", 1¼", 1½", 2", 2½", 3", 3½", 4", 5" and 6".

In exemplary embodiments, the kit comprises ten of the threaded caps.

In exemplary embodiments, each threaded cap is labeled in accordance with the threaded cap's corresponding standard conduit size.

BRIEF DESCRIPTION OF THE DRAWINGS

The features and advantages of exemplary embodiments of the present invention will be more fully understood with reference to the following, detailed description when taken in conjunction with the accompanying figures, wherein.

DETAILED DESCRIPTION

Figure 1B:
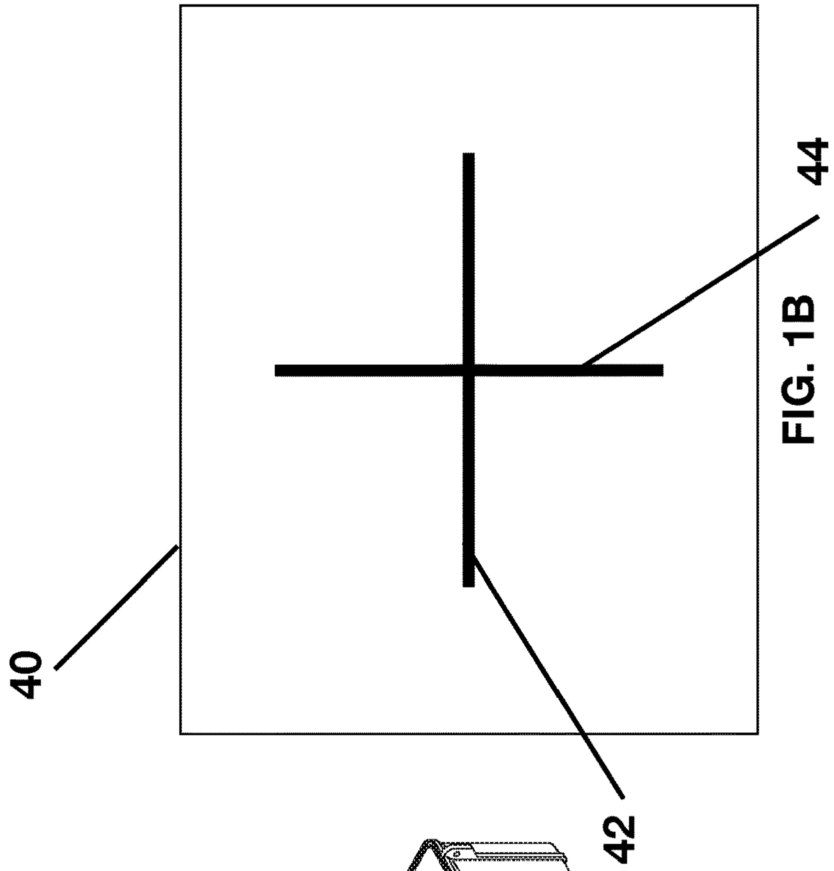
FIGS. 1A and 1B show components of a kit according to an exemplary embodiment of the present invention.
Figure 1A:
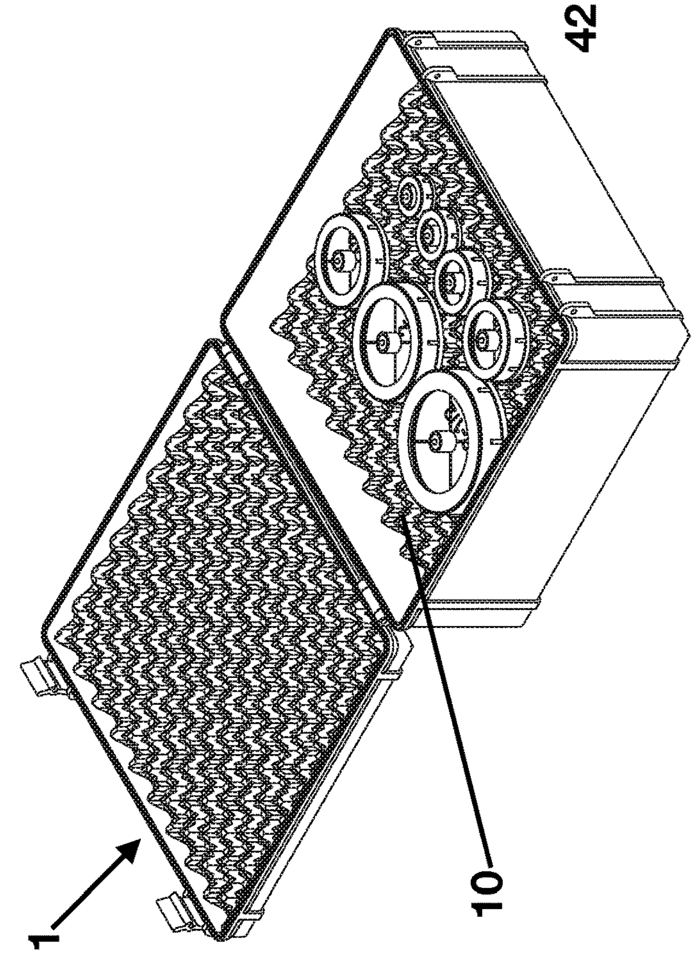

FIG. 1A is a portion of a kit, generally designated by reference number 1, according to an exemplary embodiment of the present invention. The kit 1 may include an enclosure such as a case 10 that houses one or more threaded caps 12. The case 12 may have individual compartments each configured and sized to hold a corresponding one of the threaded caps 12. The compartments may be made out of foam or other type of soft material. In exemplary embodiments, a plurality of threaded caps 12 are provided each corresponding to a different size of a standard electrical trade conduit. For example, ten threaded caps 12 may be provided with each cap sized to accommodate one of the following conduit standard diameter sizes: 1", 1¼", 1½", 2", 2½", 3", 3½", 4", 5" and 6". Each threaded cap 12 may be labeled with its corresponding conduit size. As explained in more detail below, the threaded caps 12 are configured to be attached to the threaded ends of conduits.

FIG. 1B is a centering square 40 that is also a part of the kit 1. As described in more detail below, the centering square 40 is used to form crossing marks that intersect at a point on an enclosure at which the enclosure has been center punched to mark where the enclosure will be knockout punched. The centering square 40 includes two open grooves 42, 44 that intersect at the center of the centering square 40.

Figure 2:
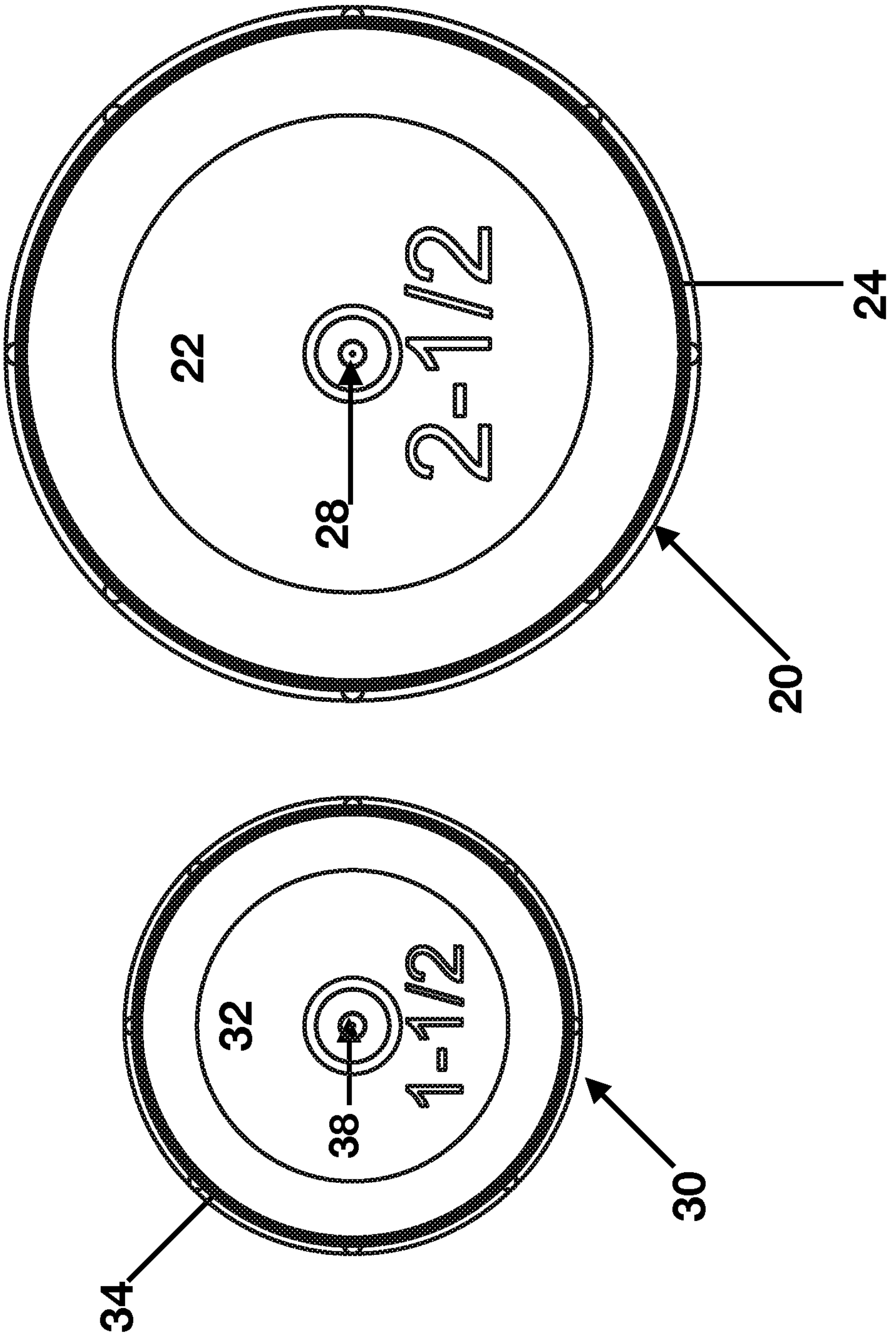
FIG. 2 shows threaded caps according to an exemplary embodiment of the present invention.

FIG. 2 show two threaded caps 20 and 30 according to exemplary embodiments of the present invention. The threaded caps 20, 30 are circular in shape and each include a top portion 22, 32 and a flange 24, 34 extending around the top portion 22, 32. The flange 24, 34 includes a portion that extends below the top portion 22, 32 and which forms a threaded interior wall. A marking element 28, 38 is disposed at the centerpoint of the top portion 22, 32. As explained in more detail below, the marking elements 28, 38 are used to measure distances to determine a location on a wall of an enclosure at which to form crossing marks for center punching. In this regard, each of the marking elements 28, 38 may be, for example, a pin with a pointed end or a laser or other type of light beam.

Use of the kit 1 to form knockout punch marks on an enclosure will now be described with reference to FIGS. 3A-3L.

Figure 3A:
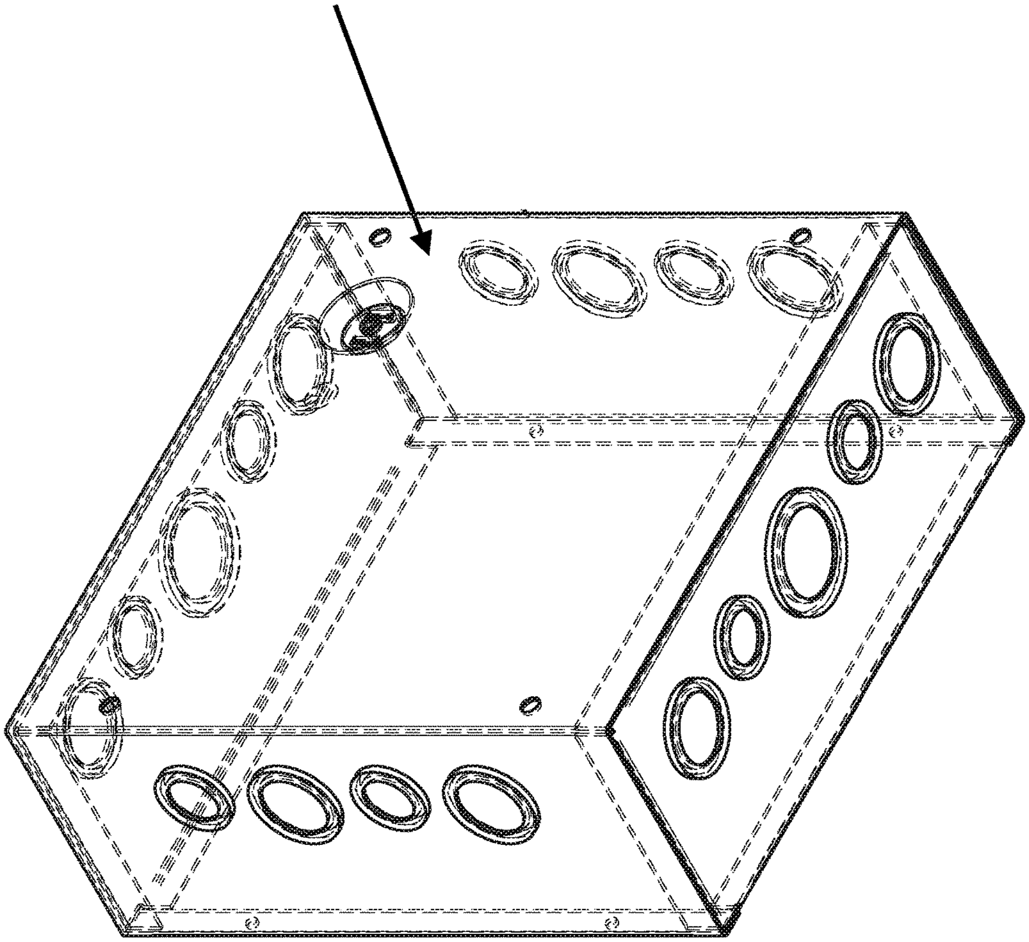
FIGS. 3A-3L show steps in a method for locating a center point of a conduit knockout to be formed in an enclosure according to an exemplary embodiment of the present invention.

As shown in FIG. 3A, a line is marked on a wall, ceiling or floor that corresponds with the edge of an enclosure 100. In this case, knock out punches will be formed in the enclosure 100 so that vertical conduits 200 extending from the floor can extend through a wall of the enclosure 100. The enclosure 100 is placed at a position on top of the conduits 200 and against the wall before the enclosure edge mark is made.

Figure 3B:
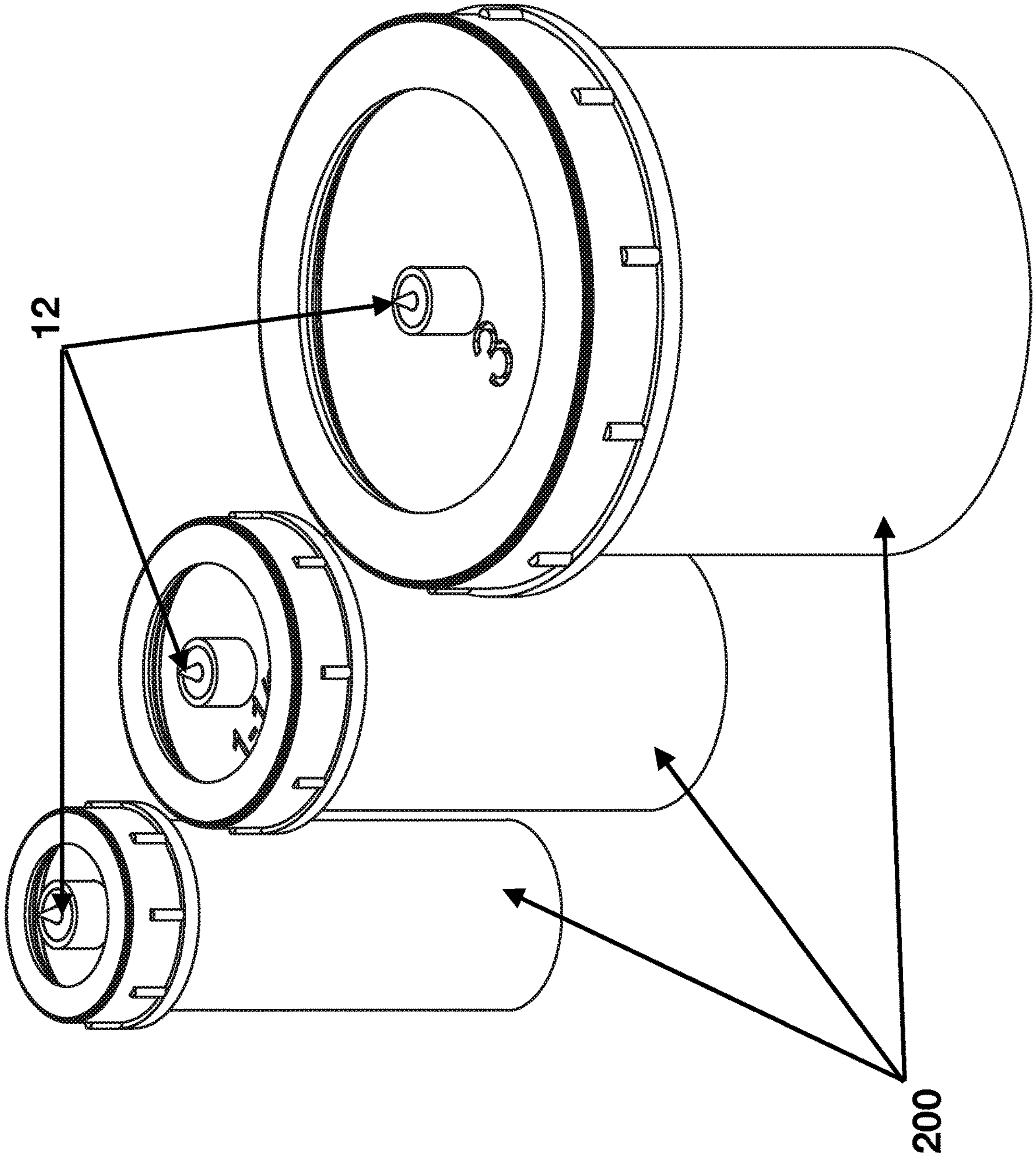

As shown in FIG. 3B, one or more of the threaded caps 12 in the kit 1 are selected so that the size of the selected threaded caps 12 match the sizes of the conduits 200 that need to extend into the enclosure. The selected threaded caps 12 are then screwed onto the tops of the corresponding conduits 200.

Figure 3C:
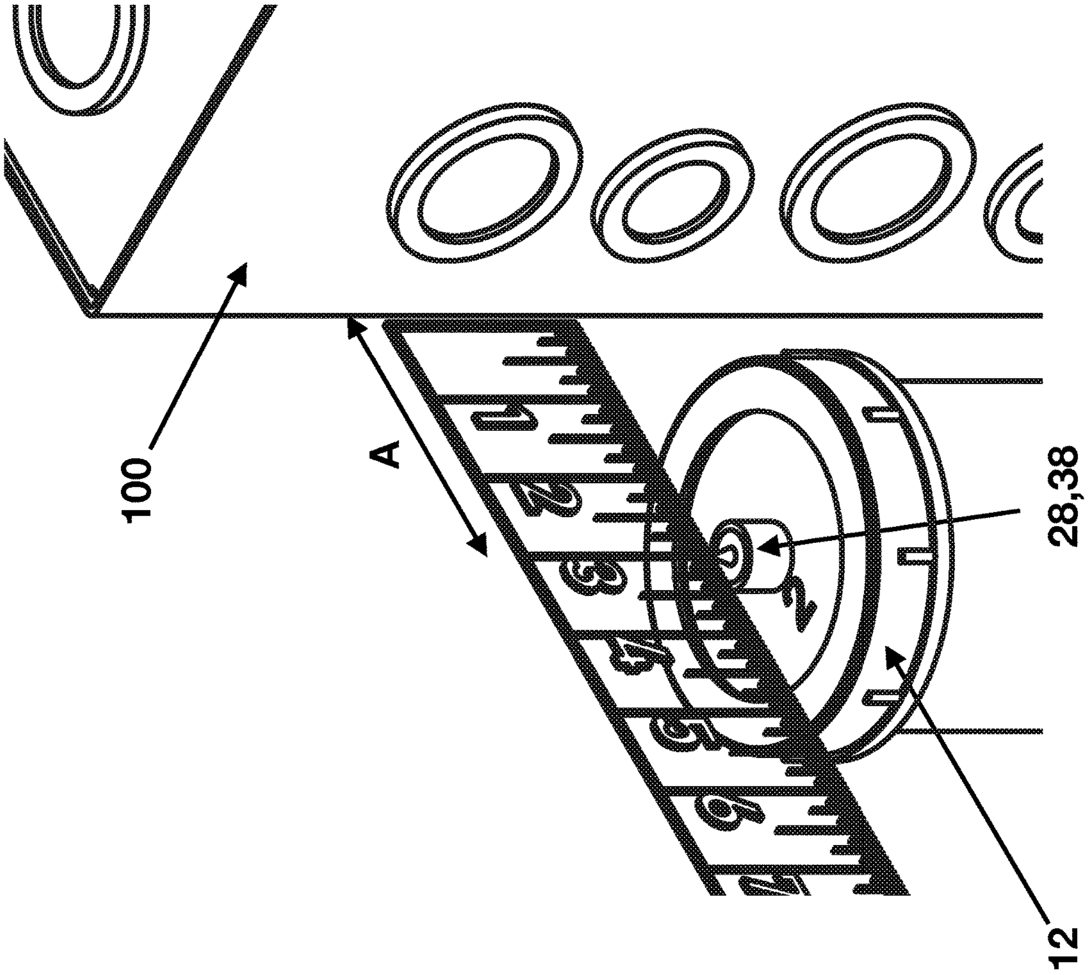

As shown in FIG. 3C, using the marking element 28, 38 of one of the selected threaded caps 12, a measurement A is taken of the distance from the center of the selected threaded cap 12 to the marked enclosure edge. In this step, if the selected threaded cap 12 is equipped with a laser or other type of light beam, the laser or light beam can be activated so that it highlights a position on the measurement instrument (which in this place is a tape measure) that corresponds with the true center of the conduit 200 on which the threaded cap 12 is installed. Use of the laser or other light beam is advantageous when the true center needs to be extended further from the conduit.

Figure 3D:
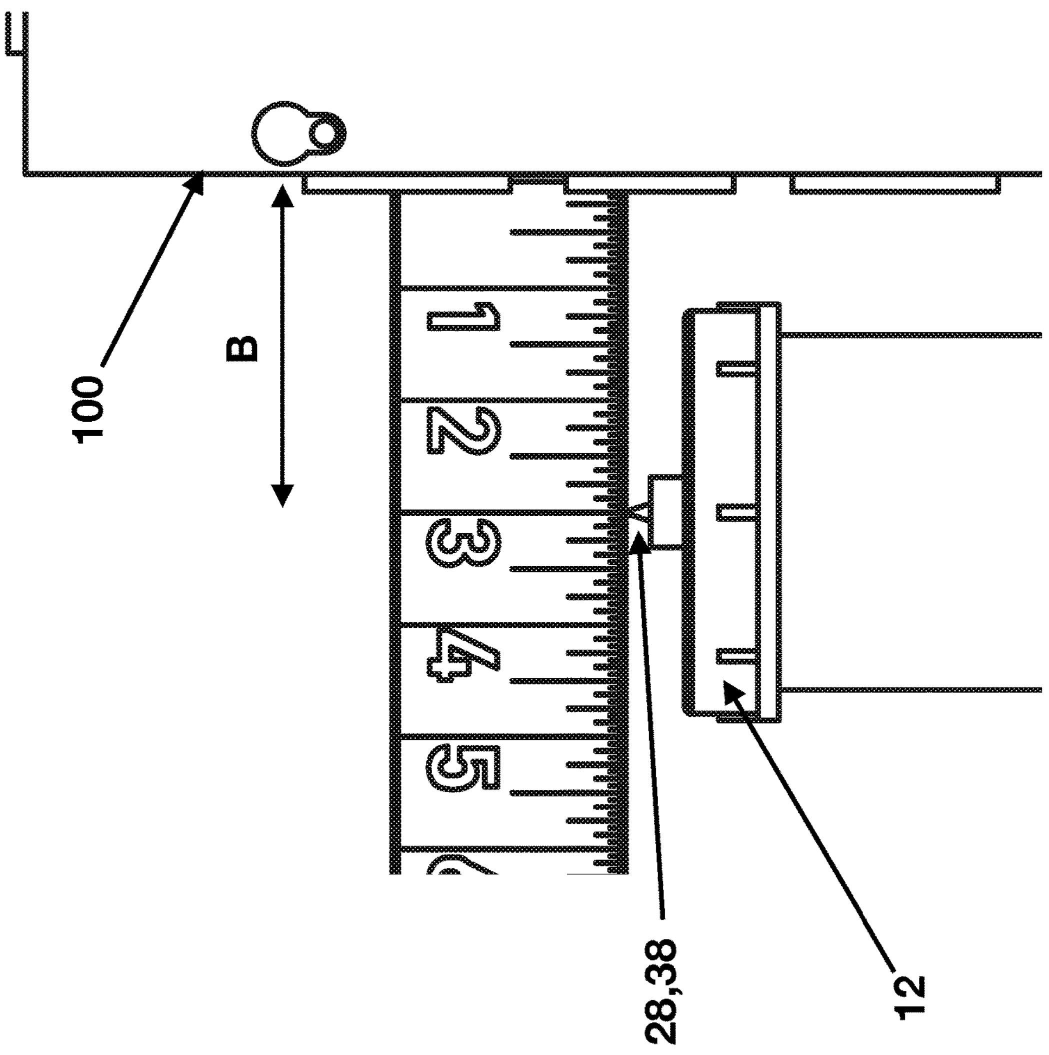
Figure 3E:
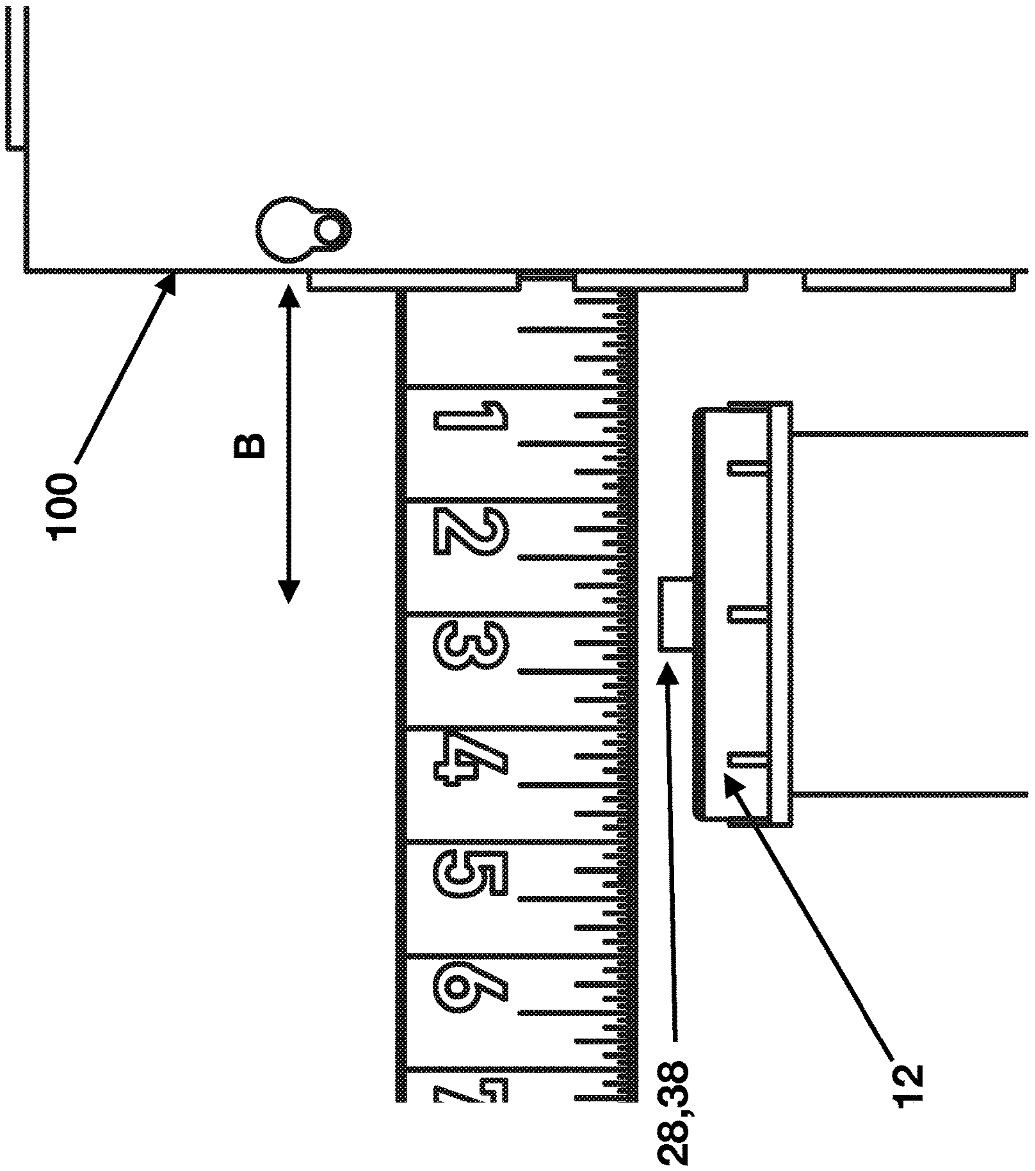

As shown in FIGS. 3D and 3E, a measurement B is take of the distance from the center of each selected threaded cap 12 to the wall adjacent the enclosure 100, which corresponds with the back surface or back edge of the enclosure. FIG. 3D shows this measurement being made with a selected threaded cap 12 that has a pin as a marking element 28, 38, while FIG. 3E shows the measurement being made with a selected threaded cap 12 that has a laser or other type of light beam as a marking element 28, 38. The laser beam hitting the measuring instrument results in a reflection on the measuring instrument that can be used to accurately take the measurement.

Figure 3F:
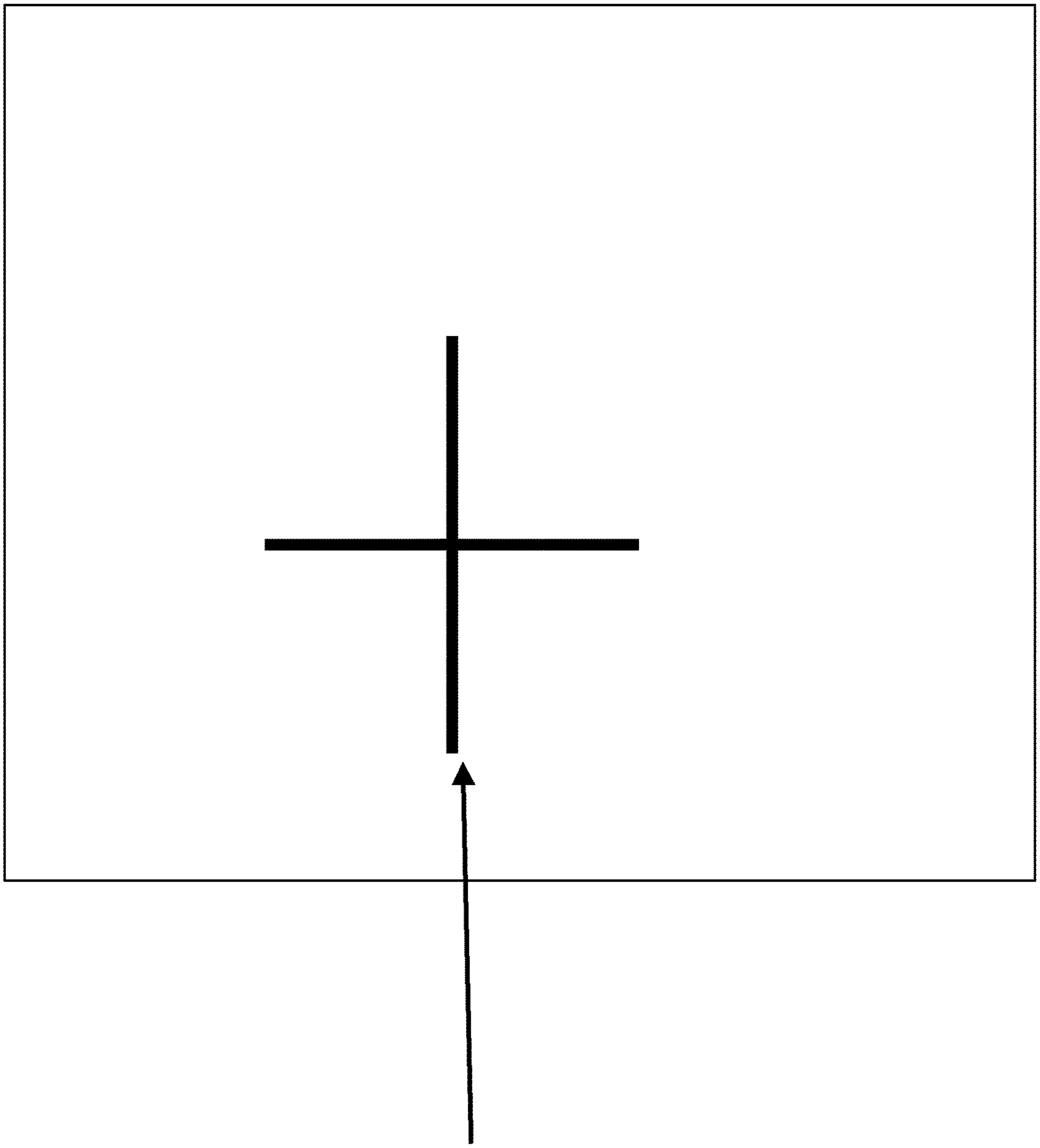

As shown in FIG. 3F, the measurements A and B are then used to form a small cross pattern 60 on the enclosure wall. This can be done with a pencil or other writing instrument. The intersection of the small cross indicates the center of the knockout that needs to be formed so that the conduit 200 can extend into the knockout with perfect alignment.

Figure 3G:
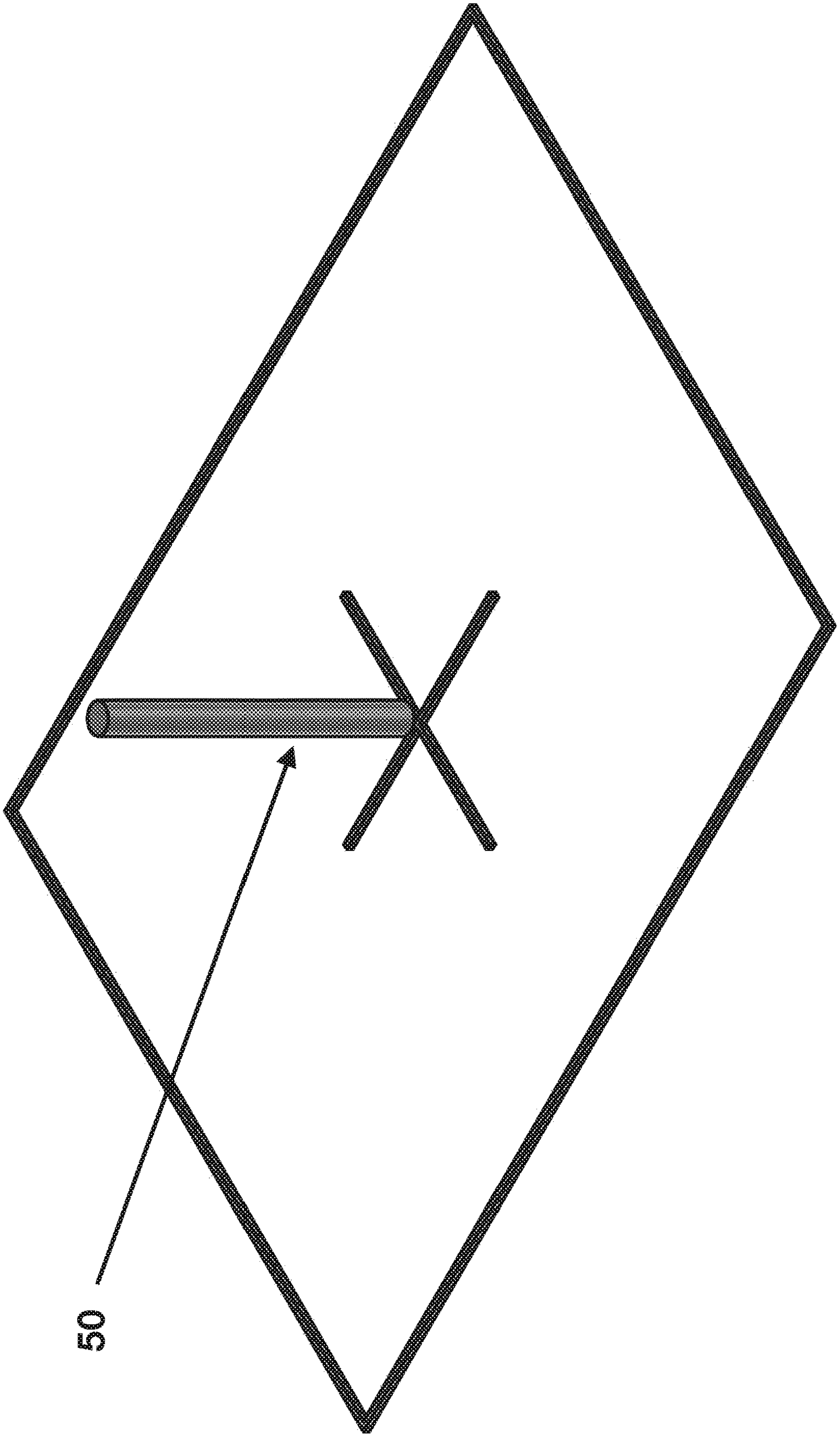

As shown in FIG. 3G, a center punch 50 is used to punch the intersection point of the small cross. The punched section indicates the center of the knockout.

The above steps can then be repeated for all the other conduits 200 that need to extend into the enclosure 100.

Figure 3H:
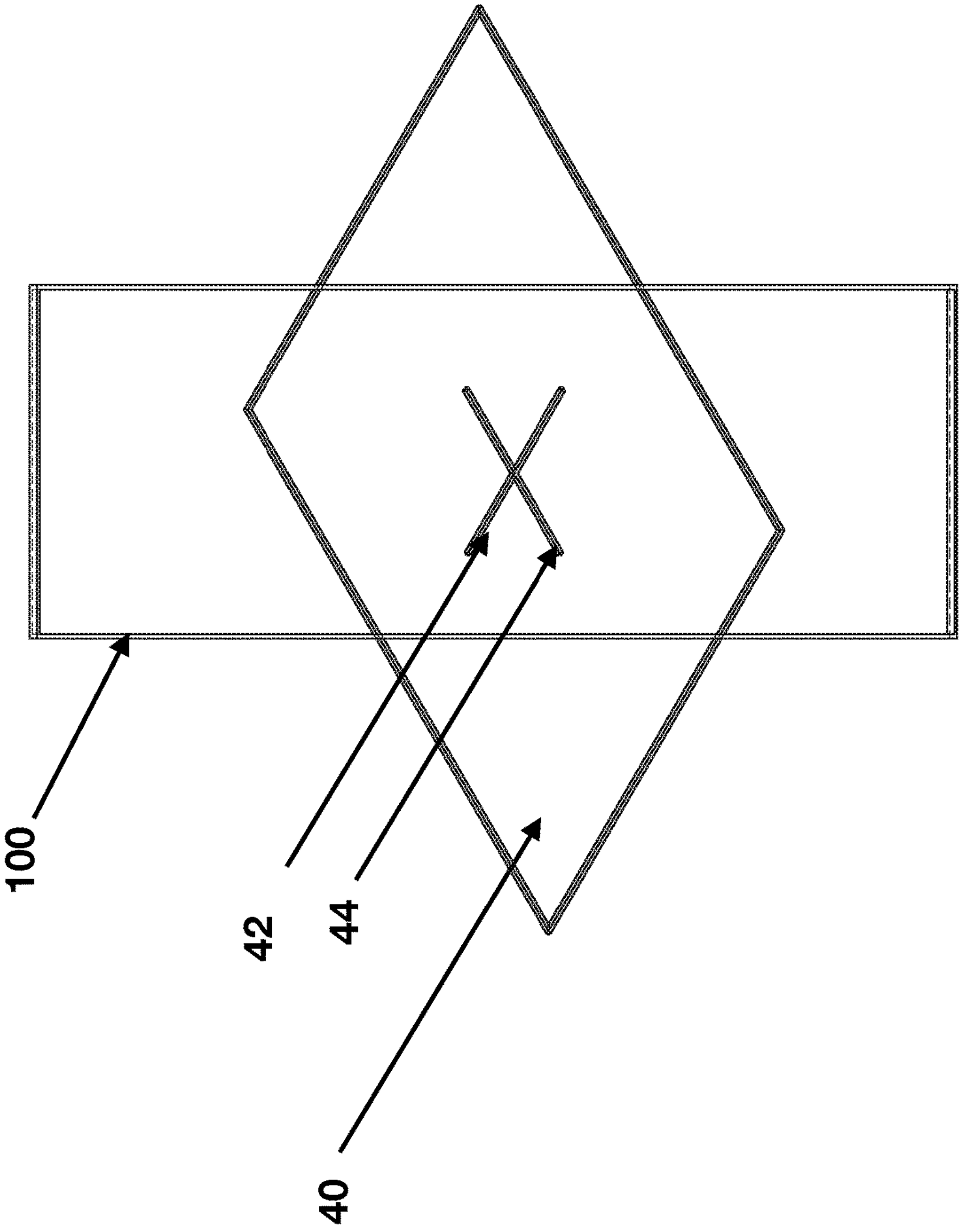

As shown in FIG. 3H, the centering square 40 of the kit 1 is then used to form crossed lines that intersect at the punched sections. In this regard, the centering square 40 is placed over each punched section so that the intersection of the grooves 42, 44 is directly on top of and aligned with the punched section, and then a marker or other writing instrument is used to form the crossed lines by marking within the open grooves 42, 44. The lines are preferably made such that they extend beyond the knockout punch receiver.

Figure 3I:
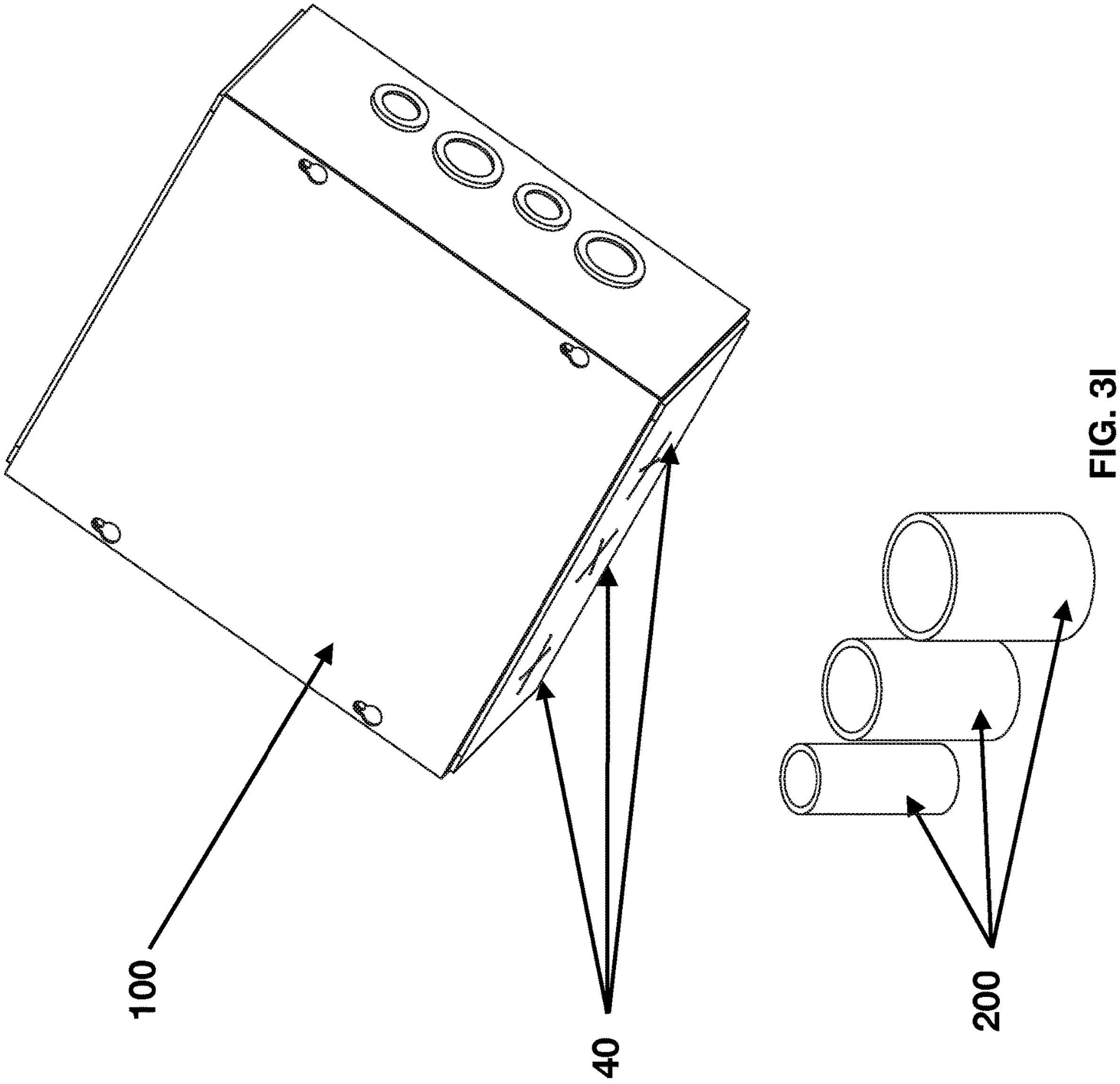

As shown in FIG. 3I, the centering square 40 is used to form crossed lines corresponding to each of the conduits 200 that need to extend into the enclosure 100.

Figure 3J:
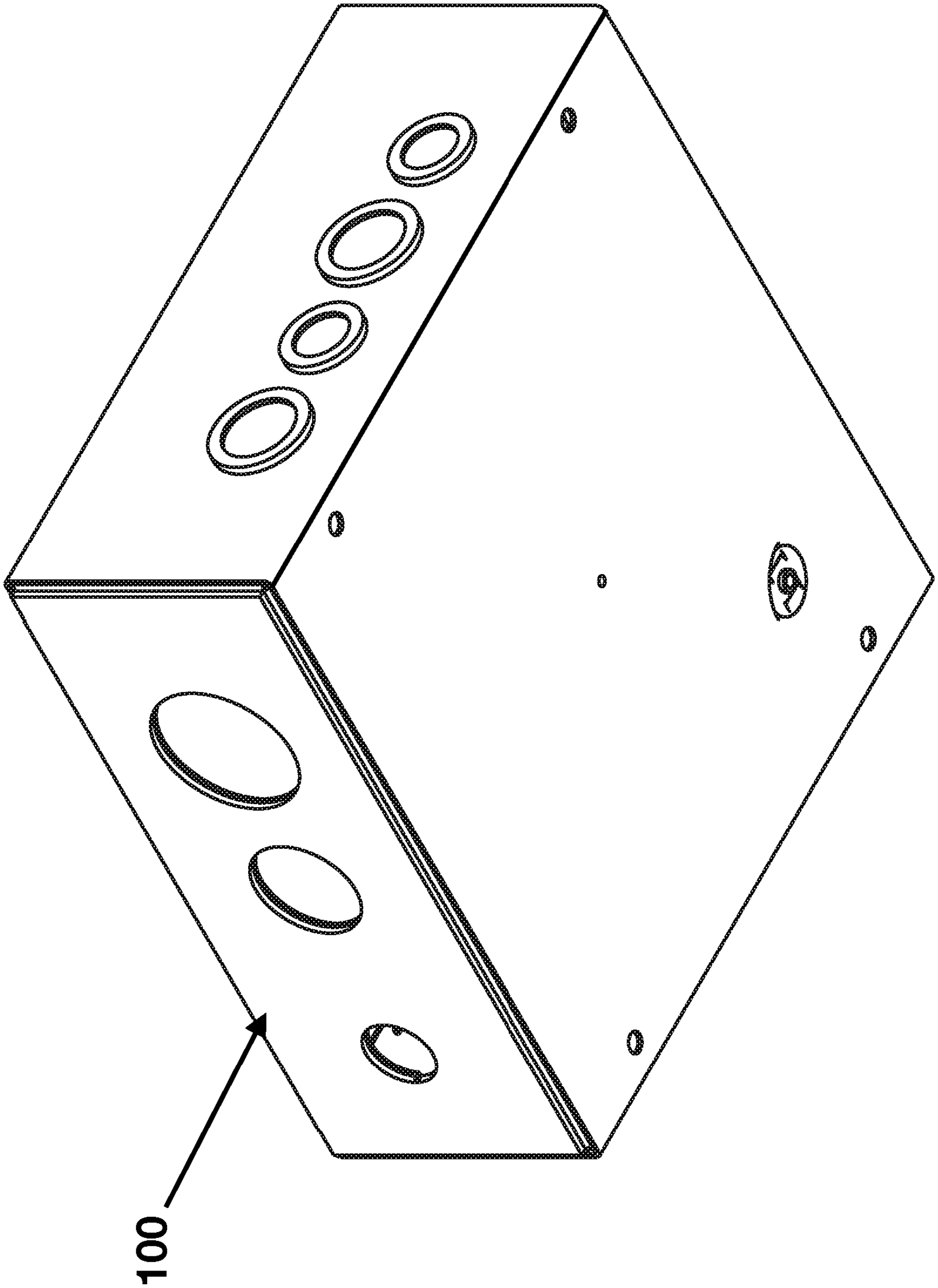

As shown in FIG. 3J, the proper size holes can be drilled depending on the size of the draw stud of the knockout punch. However, it is not necessary for the drilled hole to be of a correct size because the marked crossed lines are still available for centering of the knockout punch.

Figure 3K:
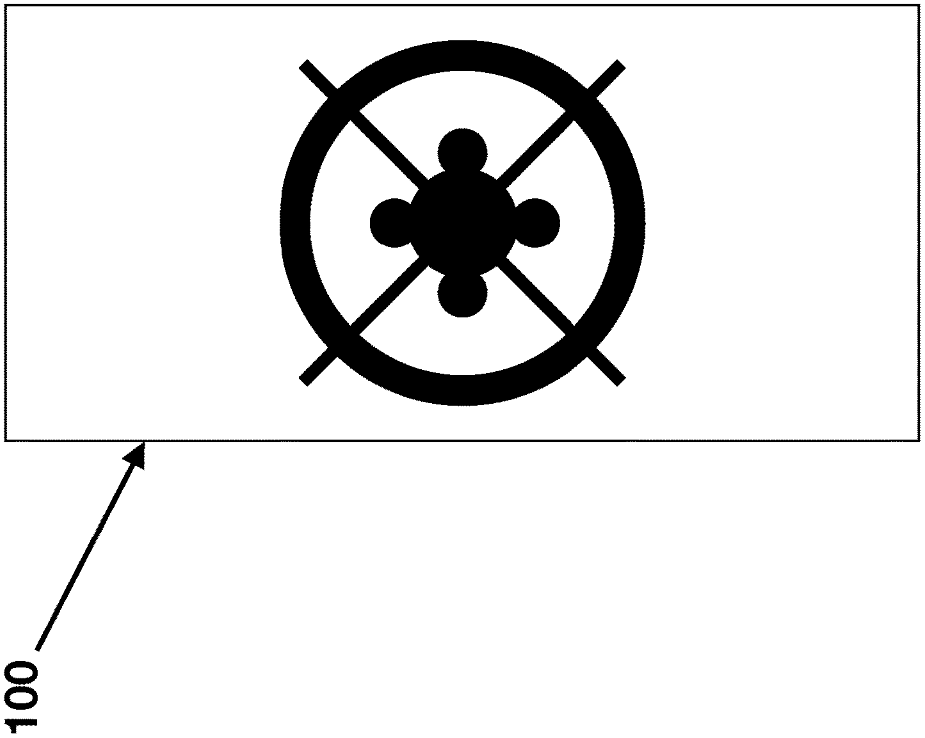

As shown in FIG. 3K, the punch out die of each knockout punch can be properly positioned on the enclosure wall by aligning the center marks on the die with the marked crossed lines.

Figure 3L:
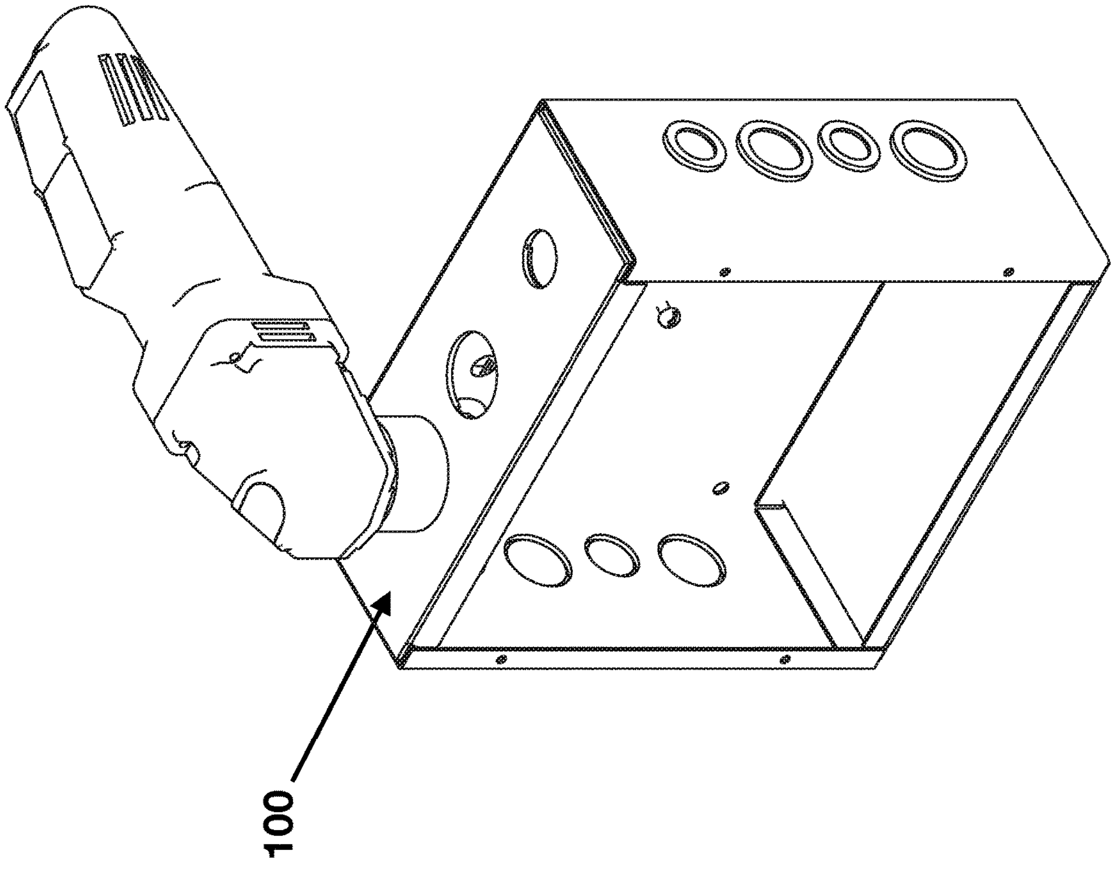
Figure 3M:
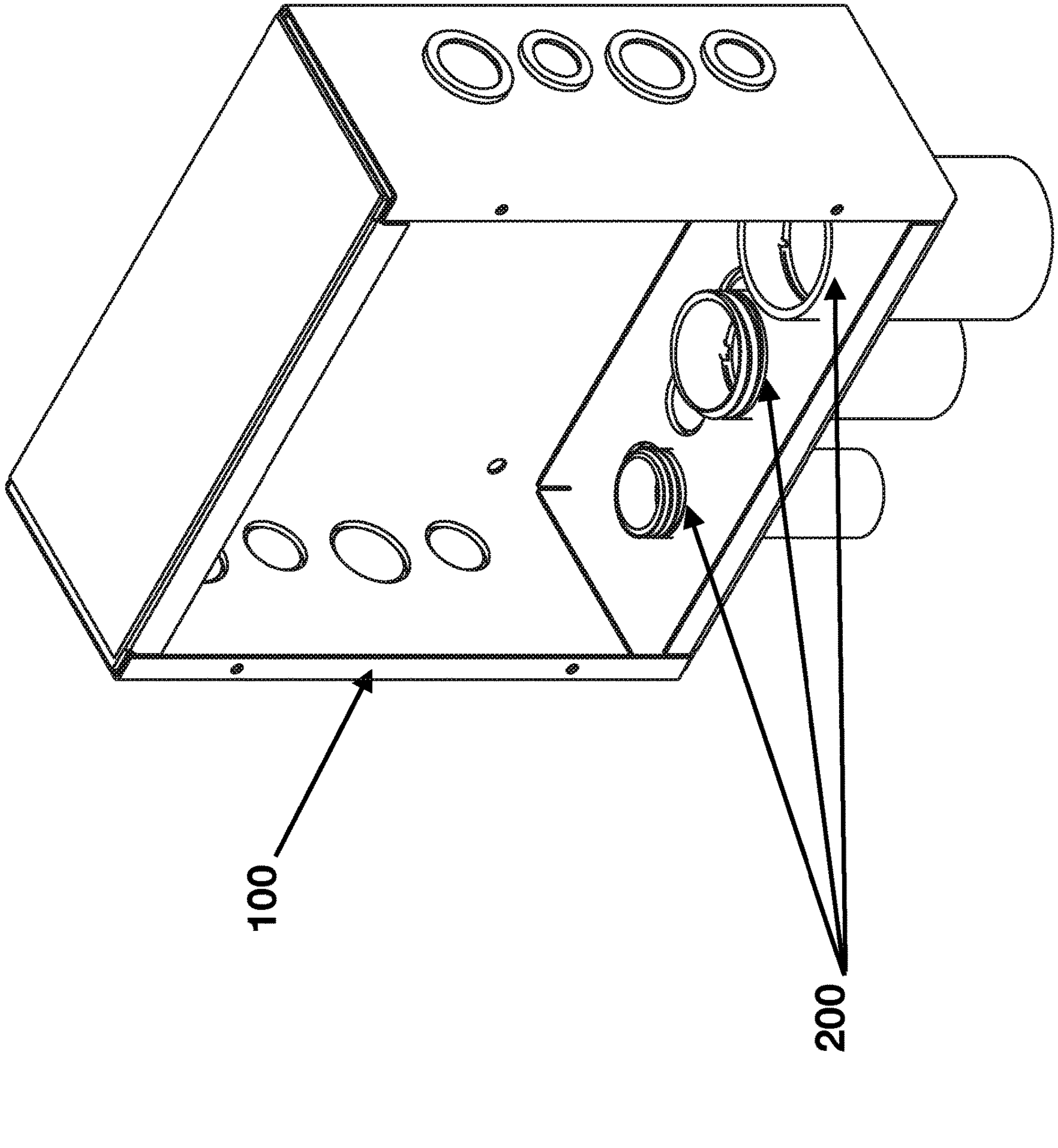
FIG. 3M shows conduits extending into an enclosure after knockouts are formed in the enclosure using the knockout center locating method of FIGS. 3A-3L.

As shown in FIG. 3L, knockouts are formed using standard trade practices with the punch out dies properly positioned. The resulting knockouts are shown in FIG. 3M, with the corresponding conduits 200 extending through the knockouts and into the enclosure 100. In FIG. 3M, the threaded caps 12 have been removed from the conduits 200.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A kit for measuring a center point for a knockout of an enclosure, comprising:

a set of threaded caps, each threaded cap having a corresponding size and a threaded interior wall that allows for threaded attachment of the threaded cap to one of a plurality of conduits having a standard diameter size, each of the plurality of conduits intended for extension into an enclosure through a corresponding knockout formed in the enclosure, each threaded cap comprising a marking element disposed at a center point of the threaded cap, the marking element configured to allow for measurement of distances from the center point of the threaded cap to an adjacent outer side edge of the enclosure and from the center point of the threaded cap to an adjacent outer front or back edge of the enclosure to thereby mark a center point of the corresponding knockout to be formed; and a centering square comprising open grooves that intersect at a crossing point, the centering square configured for placement on the enclosure with the crossing point aligned with the marked center point to allow for formation of crossed lines using the open grooves that intersect at the center point of the corresponding knockout to be formed and which can be aligned with center marks on a knockout die of a knockout punch.

2. The kit of claim 1, wherein the marking element is a pin.

3. The kit of claim 1, wherein the marking element is a laser.

4. The kit of claim 1, wherein the threaded caps are made of plastic.

5. The kit of claim 1, wherein the centering square is made of plastic.

6. The kit of claim 1, further comprising a case configured for storage of the threaded caps.

7. The kit of claim 6, wherein the case comprises compartments each corresponding to one of the threaded caps and configured for storage of the one of the threaded caps.

8. The kit of claim 7, wherein the compartments are made of foamed material.

9. The kit of claim 1, wherein each threaded cap is sized to accommodate a corresponding one of the following standard conduit sizes: 1", 1¼", 1½", 2", 2½", 3", 3½", 4", 5" and 6".

10. The kit of claim 9, wherein the kit comprises ten of the threaded caps.

11. The kit of claim 9, wherein each threaded cap is labeled in accordance with the threaded cap's corresponding standard conduit size.

* * * * *